Nov. 5, 1968     J. D. GILLETT     3,409,818

SELF-BALANCING MULTIPLE HALF BRIDGE

Filed Sept. 14, 1966

INVENTOR:
JIMMIE D. GILLETT
BY Arthur M. Sloan

ATTORNEY

United States Patent Office 3,409,818
Patented Nov. 5, 1968

3,409,818
SELF-BALANCING MULTIPLE HALF BRIDGE
Jimmie D. Gillett, Garland, Tex., assignor to Varo, Inc.
Filed Sept. 14, 1966, Ser. No. 579,277
2 Claims. (Cl. 321—27)

ABSTRACT OF THE DISCLOSURE

A self-balancing multiple half bridge circuit which forces a number of series connected bridges to share the input voltage equally. A self-balancing multiple half bridge for use in a power supply to enable the power supply to use available semiconductors to convert the high input voltage down to a prescribed lower level. The circuit reduces voltage stresses across the transformers and overcomes the voltage sharing problem.

---

This invention relates to a self-balancing multiple half bridge circuit which forces a number of series connected bridges to share the input voltage equally.

The circuit of this invention can be used to construct inverters or converters which will take a high voltage input source. The circuit keeps voltage stresses down within tolerance. The circuit reduces voltage stresses across the transformers and overcomes the voltage sharing problems.

Accordingly it is an object of this invention to provide a self-balancing multiple half bridge which forces a number of series connected bridges to share the input voltage equally.

Another object of this invention is to provide a self-balancing multiple half bridge which can be used to construct inverters or converters which will take a high voltage input source.

A further object of this invention is to provide a self-balancing multiple half bridge which keeps voltage stresses down within tolerance.

An additional object of this invention is to provide a self-balancing multiple half bridge which reduces voltage stresses across the transformers.

Still another object of this invention is to provide a self-balancing multiple half bridge which overcomes the voltage sharing problems.

Yet another object of this invention is to provide a self-balancing multiple half bridge for use in a power supply to enable the power supply to use availabe semiconductors to convert the high input voltage down to a prescribed lower level.

These and other objects of this invention will be more clearly understood from the following description taken in connection with the accompanying drawings and its scope will be apparent from the appended claims.

Figure 1:
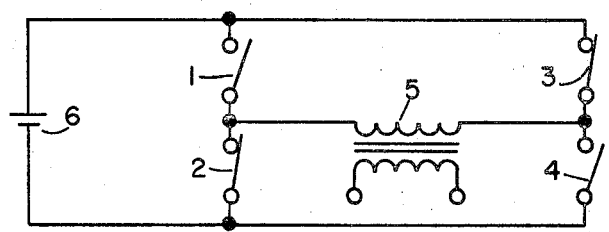
FIGURE 1 is a schematic diagram of a conventional full-bridge circuit.

The advantages of using a "bridge" inverter for the generation of a square-wave alternating current voltage from a direct current source is well known in the art. The major factor making a "bridge" inverter advantageous is the reduction in voltage switching transients normally characteristic of the commonly used push-pull systems. FIGURE 1 illustrates a conventional full-bridge. In the circuit of FIGURE 1, switch 1 and switch 2 are operated 180° out of phase, alternately "on" and "off." Switch 3 and switch 4 are also operated 180° out of phase relative to each other and at some intermediate phase angle relative to switch 1 and switch 2. The switches 1, 2, 3, and 4 may be any suitable switching elements, such as transistors.

If switch 1 and switch 3 operate 180° out of phase, a square-wave of voltage is produced across transformer 5. Load current is drawn from transformer 5. If switch 1 and switch 3 operate at an angle between 0° and 180°, a quasi square-wave results across transformer 5 with a dwell or zero voltage directly related to the relative phase of switch 1 and switch 3. Since in this circuit either switch 1 or switch 2 and conversely switch 3 or switch 4 is "on" at all times the maximum voltage across the "off" switch is the battery 6 voltage E. Further details of the operation of the full-bridge circuit will not be given since they are well known in the art.

Figure 2:
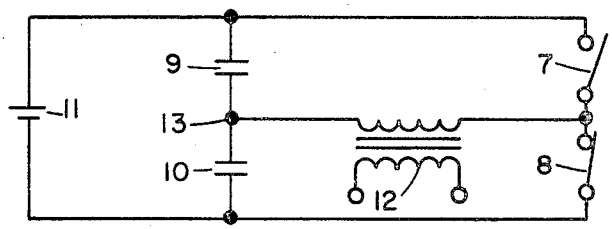
FIGURE 2 is a schematic diagram of a conventional half-bridge circuit.

A second form of bridge well known in the art is the half-bridge of FIGURE 2. Two switches 7 and 8 are used operating in conjunction with a capacitive divider including capacitors 9 and 10. This circuit operates as follows. Assuming that the potential voltage of the battery 11 is divided equally across capacitors 9 and 10 and that switch 7 is turned "on" and switch 8 is turned "off", current flows begins through the load transformer 12 and into capacitor 10 which increases the voltage across capacitor 10 causing the voltage at point 13 to rise. Since the voltage across capacitors 9 and 10 must equal the battery 11 voltage E, the voltage across capacitor 9 must decrease, discharging capacitor 9. On the next half cycle switch 8 is turned "on" and switch 7 is turned "off" causing the reverse situation to occur, i.e., capacitor 9 charges and capacitor 10 discharges. The alternating current voltage at point 13 is maintained relatively constant if the switching frequency of switch 7 and switch 8 is large compared to the resonate frequency of inductances in transformer 12 and capacitance of capacitor 9 or capacitor 10. The maximum "switch" voltage in the circuit of FIGURE 2 is the battery 11 voltage E. Again this circuit is well known to the art.

Figure 3:
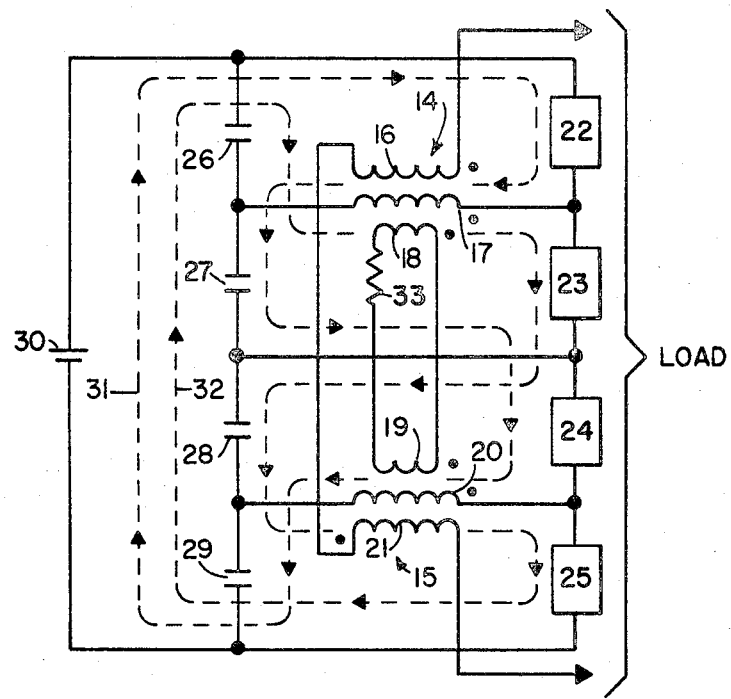
FIGURE 3 is a schematic diagram of the self-balancing multiple half-bridge of this invention.

The circuit of FIGURE 3 which embodies the invention enables power supplies to use available semiconductor switches to convert high input voltage to a prescribed lower level. This circuit provides a means of stacking half-bridges not limited to the two shown in FIGURE 3 while maintaining a predetermined voltage division. Transformers 14 and 15 are two independent transformers with windings 16, 17, 18, 19, 20, and 21. Windings 17 and 20 are the primary windings while windings 16 and 21 are the secondary windings connected in series to provide load current. Windings 18 and 19 are the tertiary windings which maintain a proper voltage division across windings 17 and 20. Switch 22, switch 23, transformer 14, capacitor 26 and capacitor 27 form one-half of the double bridge, while switch 24, switch 25, transformer 15, capacitor 28, and capacitor 29 form the other half. Operation is as follows. Assuming initially equal division of the battery 30 voltage across capacitors 26, 27, 28, and 29, switch 22 and switch 24 are turned "on" and switch 23 and switch 25 remain "off", current flows through capacitors 27 and 29 by the current flow path 31. This current flow causes charging of capacitors 27 and 29. These capacitors show a common current flow 31. This current is defined by $$i = Ec\sqrt{\frac{C}{L}} e^{-\frac{Rt}{2L}} \sin\sqrt{\frac{1}{LC}}t$$

where $Ec$=initial voltage across capacitor 27, $C$=capacitance of capacitor 27, $L$=inductance of transformer 14, $e$=the natural logarithmic (Napierian) base, $R$=the direct current resistance, and $t$=conduction time of switches 22 and 24. The voltage decay across capacitors 26 and 28 is $e_c$ where $$e_c = Ec \cos \sqrt{\frac{1}{LC}} t$$

If the switching frequency of switches 22, 23, 24, and 25 is large compared to the resonate frequency of transformer 14 and capacitor 26, the variations in individual capacitor voltage is small. On the alternate half cycle switch 23 and switch 25 are turned on and the current flow path 32 results. If capacitor values have an unbalance or other circuit parameters of unbalance in the halves of the bridge exist, a cumulative effect occurs which causes the voltage division across the capacitors to become increasingly unbalanced. However with the addition of the tertiary windings 18 and 19 connected in an opposing manner, the voltage across transformer 14 and transformer 15 primaries 17 and 20 is forced to divide in proportion to the turns ratios of the windings. If any unbalance exists, a circulation current will be set up in the tertiary windings 18 and 19 to transfer energy i.e. voltage across capacitors 26, 27, 28, and 29 from one side of the half bridge to the other until a balance is reached. By this means the half bridge can be connected in series and maintain balance, regardless of variances which might exist. Resistor 33 is to limit maximum circulating current.

What I claim as my invention and desire to secure by letters patent of the United States is:

1. A self-balancing multiple half bridge circuit which forces a number of series connected half bridges to share the input voltage equally including a source of electrical power, a transformer for each half bridge, each transformer having a primary winding and a secondary winding, the secondary windings being connected in series with each other, means in juxtaposition to each primary winding to establish a proper voltage division, said means including a tertiary winding in each transformer, all the tertiary windings being connected in opposition to each other, two capacitors in each half bridge, all the capacitors being connected in series with each other and in parallel with the source of electrical power, two switches in each half bridge, all the switches being connected in series with each other and in parallel with the source of electrical power, the primary winding in each transformer being connectetd between the two capacitors in that half bridge and the two switches in that half bridge and a load connected to the secondary windings.

2. A self balancing multiple half bridge circuit as described in claim 1 including a resistor in the tertiary winding circuit to limit maximum circulating current.

References Cited

UNITED STATES PATENTS 3,325,719    6/1967    Gillet _____ 321—45

FOREIGN PATENTS 694,850    9/1964    Canada.

JOHN F. COUCH, *Primary Examiner.*

W. SHOOP, *Assistant Examiner.*